(12) United States Patent
Dong et al.

(10) Patent No.: US 11,296,848 B2
(45) Date of Patent: Apr. 5, 2022

(54) METHOD AND DEVICE FOR TRANSMITTING INFORMATION IN WIRELESS COMMUNICATION SYSTEM

(71) Applicants: China Mobile Communication Co., Ltd Research Institute, Beijing (CN); China Mobile Communications Group Co., Ltd., Beijing (CN)

(72) Inventors: Jing Dong, Beijing (CN); Xueying Hou, Beijing (CN); Lijie Hu, Beijing (CN); Liang Xia, Beijing (CN); Xiaodong Xu, Beijing (CN); Ting Ke, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 80 days.

(21) Appl. No.: 16/625,454

(22) PCT Filed: Jun. 6, 2018

(86) PCT No.: PCT/CN2018/090107
§ 371 (c)(1),
(2) Date: Dec. 20, 2019

(87) PCT Pub. No.: WO2018/233488
PCT Pub. Date: Dec. 27, 2018

(65) Prior Publication Data
US 2021/0152311 A1 May 20, 2021

(30) Foreign Application Priority Data

Jun. 22, 2017 (CN) .......................... 201710482718.2

(51) Int. Cl.
*H04W 72/12* (2009.01)
*H04W 72/04* (2009.01)
(Continued)

(52) U.S. Cl.
CPC .......... *H04L 5/0053* (2013.01); *H04L 5/0048* (2013.01); *H04L 5/0094* (2013.01);
(Continued)

(58) Field of Classification Search
CPC ................ H04L 5/0053; H04L 5/0048; H04L 27/26025; H04L 5/0094; H04W 72/0406
See application file for complete search history.

(56) References Cited

U.S. PATENT DOCUMENTS 10,568,071 B2 * 2/2020 Park .................... H04W 72/042
2009/0185632 A1 7/2009 Cai et al.
(Continued)

FOREIGN PATENT DOCUMENTS

CN 101904125 A 12/2010
CN 106376050 A 2/2017
(Continued)

OTHER PUBLICATIONS

R1-1609283, 3GPP TSG RAN WG1 meeting #86bis, Lisbon, Portugal Oct. 14, 2016, Agenda Item 8.1.7.2, 4 pages.
(Continued)

*Primary Examiner* — Faruk Hamza
*Assistant Examiner* — Abusayeed M Haque
(74) *Attorney, Agent, or Firm* — Morgan, Lewis & Bockius LLP

(57) ABSTRACT

The present disclosure provides a method and a device for transmitting information in a wireless communication system. In the method for transmitting information in a wireless communication system provided by embodiments of the present disclosure, a granularity is provided, when uplink
(Continued)

receiving first information transmitted by a communication peer end at a first time-domain transmission unit — 11 transmitting second information to the communication peer end at a second time-domain transmission unit — 12

(UL) and downlink (DL) adopt different numerologies, and a corresponding timing is provided by taking the granularity as a unit, which provides a basis for scheduling design of 5G New Radio (NR).

16 Claims, 3 Drawing Sheets

(51) Int. Cl.
  *H04L 1/00* (2006.01)
  *H04L 5/00* (2006.01)
  *H04L 27/26* (2006.01)

(52) U.S. Cl.
  CPC ... *H04L 27/26025* (2021.01); *H04W 72/0406* (2013.01); *H04W 72/0446* (2013.01); *H04W 72/1278* (2013.01)

(56) References Cited

U.S. PATENT DOCUMENTS

| | | | |
|---|---|---|---|
| 2013/0194980 A1* | 8/2013 | Yin | H04L 1/1607 370/280 |
| 2016/0337087 A1 | 11/2016 | Chen et al. | |
| 2017/0142712 A1* | 5/2017 | Lee | H04L 5/0094 |
| 2019/0058552 A1* | 2/2019 | Yang | H04B 10/5561 |
| 2019/0342864 A1* | 11/2019 | Hwang | H04L 5/0053 |
| 2020/0100273 A1* | 3/2020 | Gao | H04L 5/001 |
| 2020/0296673 A1* | 9/2020 | Ouchi | H04J 1/00 |

FOREIGN PATENT DOCUMENTS

| | | |
|---|---|---|
| CN | 106793127 A | 5/2017 |
| WO | WO 2016/071148 A1 | 5/2016 |

OTHER PUBLICATIONS

R1-162778, 3 GPP TSG RAN WG1 Meeting #84-bis, Busan, Korea, Apr. 11-15, 2016, Agenda Item 7.2.1.2.3, 6 pages.
R1-164100, 3 GPP TSG RAN WG1 Meeting #85, Nanjing, China, May 23-27, 2016, Agenda Item 6.1.6, 9 pages.
R1-167124, 3GPP TSG RAN WG1 Meeting #86, Gothenburg, Sweden, Aug. 22-26, 2016, Agenda Item 8.1.1, 3 pages.
R1-1710783, 3 GPP TSG RAN WG1 Meeting NR Adhoc, Qingdao, China, Jun. 27-30, 2017, Agenda Item 5.1.3.3.5.1, 11 pages.
Japanese Office Action (First) dated Jan. 6, 2021, for Japanese Patent Application No. 2019-571253, 3 pages.
English Translation of Japanese Office Action (First) dated Jan. 6, 2021, for Japanese Patent Application No. 2019-571253, 3 pages.
Extended European Search Report dated Feb. 22, 2021 for European Patent Application No. 18821438.1, 11 pages.
Chinese Office Action (First) dated Mar. 19, 2020, for Chinese Patent Application No. 201710482718.2, 7 pages.
English Translation of Chinese Office Action (First) dated Mar. 19, 2020, for Chinese Patent Application No. 201710482718.2, 3 pages.
Chinese Office Action (Second) dated Jun. 18, 2020, for Chinese Patent Application No. 201710482718.2, 8 pages.
English Translation of Chinese Office Action (Second) dated Jun. 18, 2020, for Chinese Patent Application No. 201710482718.2, 9 pages.

* cited by examiner

METHOD AND DEVICE FOR TRANSMITTING INFORMATION IN WIRELESS COMMUNICATION SYSTEM

CROSS-REFERENCE TO RELATED APPLICATION

This application is the U.S. national phase of PCT Application PCT/CN2018/090107 filed on Jun. 6, 2018, which claims priority to Chinese Patent Application No. 201710482718.2, filed with the National Intellectual Property Administration, People's Republic of China (PRC) on Jun. 22, 2017, which is incorporated by reference in its entirety.

TECHNICAL FIELD

The application relates to mobile communication technologies, and more particularly, to a method and a device for transmitting information in a wireless communication system.

BACKGROUND

Long Term Evolution (LTE) system has defined a scheduling subframe and a feedback subframe, when uplink (UL) and downlink (DL) subframes transmit a service channel. For example, when a subframe n receives a UL grant, a subframe (n+k) transmits a Physical Uplink Shared Channel (PUSCH). For the PUSCH transmitted within subframe n, an Acknowledge (ACK)/Non-acknowledge (NACK) feedback is made in subframe $(n+k_{PHICH})$. When sensing a Physical Downlink Shared Channel (PDSCH) transmission in a DL subframe (n−k), a User Equipment (UE) will reply an ACK/NACK in a UL subframe n. Foregoing timing is defined, based on the same numerology of UL and DL subframes. Here, the numerology may specifically include subcarrier spacing, a single Orthogonal Frequency Division Multiplexing (OFDM) symbol length, quantity of symbols, a Cyclic Prefix (CP) length, a Resource Block (RB) size, a subframe size, and so on.

A Time Division Long Term Evolution (TD-LTE) adopts a Sub-frame structure with equal length: each subframe is 1 ms, including two time slots of 0.5 ms. 10 subframes constitute a 10 ms Radio Frame. A basic scheduling/Transport Time Interval (TTI) of a TD-LTE system is one subframe, that is, 1 ms. Correspondingly, a TTI interval between a feedback TTI and a data-transmission TTI is set, based on some factors, e.g., a data transmission delay, time consumed by a device when processing data, which may be a time length of 4 TTIs in general.

In the design of the 5G New Radio (NR), the DL transmission and the UL transmission may adopt different numerologies, for example, the UL transmission may adopt a smaller numerology to improve the UL coverage. Alternatively, the DL transmission and the UL transmission adopt the same numerology, and different granularities of scheduling time (e.g., the urgency of a UL transmission service is different from that of a DL transmission service). Thus, the UL scheduling timing, or, ACK/NACK feedback timing of PUSCH/PDSCH need to be indicated to a terminal. It is necessary to design the specific indication. When the UL and DL subframes adopt different numerologies, the terminal cannot determine the scheduling time granularity and Hybrid Automatic Repeat reQuest (HARD) timing. Thus, a method is needed to determine the scheduling timing or feedback timing, when the UL and DL subframes adopt different numerologies.

SUMMARY

The technical problem to be solved by embodiments of the present disclosure is to provide a method and a device for transmitting information in a wireless communication system, which may determine scheduling timing or feedback timing, when the UL and DL adopt different numerologies.

To solve foregoing technical problem, an embodiment of the present disclosure provides a method for transmitting information in a wireless communication system, including:

receiving first information transmitted by a communication peer end at a first time-domain transmission unit;

transmitting second information to the communication peer end at a second time-domain transmission unit;

wherein each time-domain transmission unit corresponds to uplink (UL) or downlink (DL) transmission resources, the UL and DL transmission resources possess different numerologies, timing between the first and second time-domain transmission units is represented by a granularity, which corresponds to a reference numerology.

An embodiment of the application also provides a transmission device in a wireless communication system, including:

a receiving unit, configured to receive first information transmitted by a communication peer end at a first time-domain transmission unit;

a transmitting unit, configured to transmit second information to the communication peer end at a second time-domain transmission unit;

wherein each time-domain transmission unit corresponds to UL or DL transmission resources, the UL and DL transmission resources possess different numerologies, timing between the first and second time-domain transmission units is represented by a granularity corresponding to a reference numerology.

An embodiment of the application also provides a transmission device in a wireless communication system, including: a memory, a processor, and a computer program stored by the memory, wherein the computer program is executable by the processor, when being executed by the processor, causing the processor to perform foregoing steps of the method for transmitting information in the wireless communication system.

An embodiment of the application also provides a computer readable storage medium, wherein the computer readable storage medium stores a computer program, that when executed by a processor, causing the processor to execute foregoing steps of the method for transmitting information in the wireless communication system.

Compared with the prior art, an embodiment of the present disclosure provides a method and a device for transmitting information in a wireless communication system. In the method for transmitting information in a wireless communication system, which is provided by embodiments of the present disclosure, when UL and DL adopt different numerologies, a granularity is provided. And, a corresponding timing is provided, by taking such granularity as a unit, which provides a basis for 5G New Radio (NR) scheduling design.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
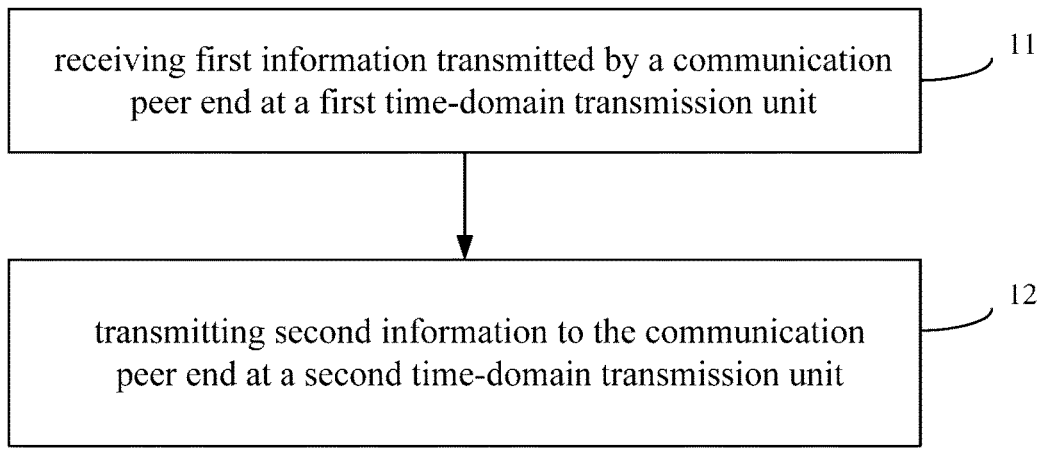
FIG. 1 is a flowchart illustrating a method for transmitting information in a wireless communication system, in accordance with an embodiment of the present disclosure.

In order to make the objects, the technical solutions and the advantages of the present disclosure more apparent, the present disclosure will be described hereinafter in a clear and complete manner in conjunction with the drawings and embodiments. In the following descriptions, to facilitate understanding embodiments of the present disclosure, specific configurations and specific details of components are provided. Thus, persons having ordinary skill in the art should understand that, various changes and modifications may be made to the embodiments described here, without departing from scope and spirit of the present disclosure. In addition, for clarity and simplicity, descriptions about known functions and constructions are omitted.

It should be understood that, the phrase "one embodiment" or "an embodiment" as used throughout the specification means that a particular feature, structure, or characteristic relating to an embodiment is included in at least one embodiment of the present disclosure. Thus, "in one embodiment" or "in an embodiment" as used throughout the specification does not necessarily refer to the same embodiment. In addition, these specific features, structures, or characteristics may be combined in any suitable manner in one or more embodiments.

In various embodiments of the present disclosure, it should be understood that, the sequence numbers of the following processes do not imply the order of execution. The order of execution of each process should be determined by its function and internal logic, which should not constitute any limitation to the implementation processes of the embodiments of the application. In addition, the terms "system" and "network" are often used interchangeably herein. It should be understood that, the term "and/or" in this application is merely an association describing the associated object, indicating that there may be three relationships. For example, A and/or B, may indicate three cases, i.e., A exists independently, A and B exist simultaneously, and B exists independently. In addition, the character "/" in the application generally indicates that the contextual objects are in an "or" relationship.

In the embodiments of the present disclosure, the form of the base station is not limited, which may be a Macro Base Station, a Pico Base Station, a Node B (the name of the 3G mobile base station), an enhanced Node B (eNB), a Femto eNB or a Home eNode B or a Home eNB or an HeNB, a relay station, an Access Point (AP), a Remote Radio Unit (RRU), a Remote Radio Head (RRH), a gNB (the name of the 5G mobile base station), a network side node in the 5G system, e.g., a Central Unit (CU) and a Distributed Unit (DU), and so on. A terminal may be a mobile phone (or cellphone), or another device which is capable of transmitting and receiving a wireless signal, including a UE, a Personal Digital Assistant (PDA), a wireless modem, a wireless communication device, a handheld device, a laptop, a cordless phone, a Wireless Local Loop (WLL) station, a Customer Premise Equipment which is capable of converting a mobile signal into a WiFi signal, or a mobile smart hotspot, a smart appliance, or another device which may spontaneously communicate with a mobile communication network without a human operation, and so on.

With reference to FIG. 1, an embodiment of the present disclosure provides a method for transmitting information in a wireless communication system, which is applied to a communication local end. The communication local end may be a base station or a terminal, as shown in FIG. 1, the method includes the following blocks.

In block 11, receiving first information transmitted by a communication peer end at a first time-domain transmission unit.

Here, the first information specifically may include service data, or scheduling authorization information. Each time-domain transmission unit corresponds to one UL transmission resource, or one DL transmission resource. Specifically, the time-domain transmission unit may include any one of the following: a subframe, time-domain resources of 1 ms length, a slot, a mini-slot, a symbol group consisting of at least one OFDM symbol, or a slot group consisting of at least one slot. In the embodiments of the present disclosure, UL and DL transmission resources possess different Numerologies. The Numerology includes any one of: a subcarrier spacing, a symbol length, or a quantity of symbols in a time-domain transmission unit.

In block 12, transmitting second information to the communication peer end at a second time-domain transmission unit, in which the timing between the first and second time-domain transmission units is demonstrated by a granularity corresponding to a Numerology.

Here, the Numerology is different from that of DL transmission resources. Alternatively, the Numerology is different from that of UL transmission resources. Still alternatively, the Numerology is different from that of UL and DL transmission resources. That is, the Numerology is different from that about at least one of UL and DL transmission resources.

The granularity refers to a time-domain transmission unit corresponding to the Numerology. Specifically, the length of the time-domain transmission unit may be determined by subcarrier spacing, symbol length, quantity of symbols in the time-domain transmission unit of the Numerology, and so on.

The second information may be receiving feedback information of service data, or service data scheduled by scheduling grant information. When the first information is service data (e.g., PUSCH/PDSCH), the second information is receiving feedback information of service data, e.g., ACK/NACK feedback information. When the first information is scheduling grant information (e.g., UL grant), the second information is PUSCH. Correspondingly, foregoing blocks may be implemented at network side, or at terminal side. For example, when implemented at the base station of the network side, the first information may be PUSCH, and the second information may be ACK/NACK feedback information of the PUSCH. When implemented at the terminal, the first information may be PDSCH, and the second information may be ACK/NACK feedback information of the PDSCH. Alternatively, the first information may be UL grant, and the second information is PUSCH.

Through the above steps, in the embodiment of the present disclosure, the timing between the first and second time-domain transmission units is demonstrated by a granularity, which corresponds to a reference Numerology. Subsequently, the communication local end may determine the time-domain position of second information, based on foregoing timing, and then transmit the second information. Thus, when UL and DL respectively adopt a different numerology, determination of scheduling timing or feedback timing and transmission of second information are implemented.

Specifically, a timing between the first time-domain transmission unit and the second time-domain transmission unit may be demonstrated with an offset value k0, in which k0 is an offset value of the second time-domain transmission unit compared with the first time-domain transmission unit, and k0 is demonstrated with the granularity. For example, when the first time-domain transmission unit is located in a granularity numbered n, the second time-domain transmission unit is located in a granularity numbered (n+k0). Here, n and k0 are both integers greater than 1.

In the embodiment of the present disclosure, a terminal is configured with at least one parameter of the timing, numerology of UL transmission resources, numerology of DL transmission resources, transmission direction of time-domain transmission resources (e.g., UL or DL), or the granularity in advance by the network side. The specific configuration mode may be as follows. The network side carries some parameters or all the parameters of at least one above parameter, by using one or more messages of a system message, a DL control message, high-level signaling (e.g., RRC signaling), and transmits to the terminal. The terminal obtains carried parameters, based on received message, so as to achieve foregoing configuration.

For example, the RRC signaling may carry at least one of the timing, numerology of UL transmission resources, numerology of DL transmission resource, transmission direction of time-domain transmission unit, or the granularity, and transmit to the terminal. In another example, the system message may be used to carry parameters, e.g., the timing, and transmit to the terminal. In addition, the RRC signaling is used to carry at least one of foregoing numerology of UL transmission resources, numerology of DL transmission resources, transmission direction of time-domain transmission unit, or the granularity, and transmit to the terminal, and so on.

Thus, in foregoing block 12, the terminal may determine a second number, based on a first number of the granularity located by the first information and the timing, and transmit the second information on the second time-domain transmission unit corresponding to the second number.

Detailed descriptions about foregoing solution in the embodiment of the present disclosure will be provided in the following, accompanying with attached figures and specific examples. In the following example, descriptions are provided by taking a time-domain transmission unit as a time slot. It should be noted that, the following example does not constitute a limitation of the present disclosure. The time-domain transmission unit may be in other form as described above.

Example 1

A first product of symbol length and subcarrier spacing in the numerology of UL transmission resource is the same as a second product, which is a product of symbol length and subcarrier spacing in the numerology of DL transmission resource. At this time, the time-domain transmission units respectively corresponding to numerology of UL and DL transmission resources are configured with the same time-domain length. For example, if respective quantity of symbols in the numerology of UL and DL transmission resources is the same, the subcarrier spacing is greater, single symbol length of the time domain is shorter, and the length of the time-domain transmission unit is also shorter. Here, the symbol length in the application refers to the length of a single symbol on the time domain. The granularity is a time-domain transmission unit, which corresponds to the numerology of UL or DL transmission resources.

In the example 1, the UL numerology and DL numerology are matched to the same time length. For example:

a) UL subcarrier spacing is 15 KHz, a UL slot length is 7 symbols; DL subcarrier spacing is 30 KHz, and a DL slot length is 14 symbols;

b) the UL subcarrier spacing is 30 KHz, and the UL slot length is 14 symbols; the DL subcarrier spacing is 15 KHz, and the DL slot length is 7 symbols.

A time length corresponding to numerology of transmission resources is inversely proportional to the subcarrier spacing, and is proportional to the symbol length. By adopting the numerology of foregoing a) or b), although UL and DL transmission resources respectively possess a different numerology, corresponding time length thereof is the same, that is, the time-domain length of a time-domain transmission unit corresponding to DL transmission resources, or numerology of DL transmission resources is the same as that of a time-domain transmission unit, which corresponds to the DL transmission resources.

Example 2

The numerology of UL transmission resources and the numerology of DL transmission resources respectively have a different symbol length, a different subcarrier spacing, and have the same quantity of symbols. Alternatively, the numerology of UL transmission resources and the numerology of DL transmission resources have the same symbol length, the same subcarrier spacing, and different quantities of symbols.

That is, the symbol length of numerology of the UL transmission resources is different from that of numerology of the DL transmission resources, and quantity of symbols corresponding to the time-domain transmission unit thereof is the same, meanwhile, the subcarrier spacing in the numerology of the UL transmission resources is different from that in the numerology of the DL transmission resources. Alternatively, the symbol length in the numerology of the UL transmission resources is the same as that in the numerology of the DL transmission resources, besides, the subcarrier spacing in the numerology of the UL transmission resources is the same as that in the numerology of the DL transmission resources, however, the quantity of symbols corresponding to the time-domain transmission unit thereof is different.

In the example, the granularity includes: a time-domain transmission unit corresponding to the numerology of the DL transmission resources, and, a time-domain transmission unit corresponding to the numerology of the UL transmission resources.

Specifically, in example 2, the timing of UL scheduling, or ACK/NACK feedback timing of PUSCH/PDSCH may be indicated, based on (n+k)*granularity. The granularity is related with respective Numerology of UL and DL. That is, for UL time-domain transmission unit and DL time-domain transmission unit, the granularity respectively possesses a different time-domain length, which is respectively determined by Numerology of UL and DL.

Figure 2:
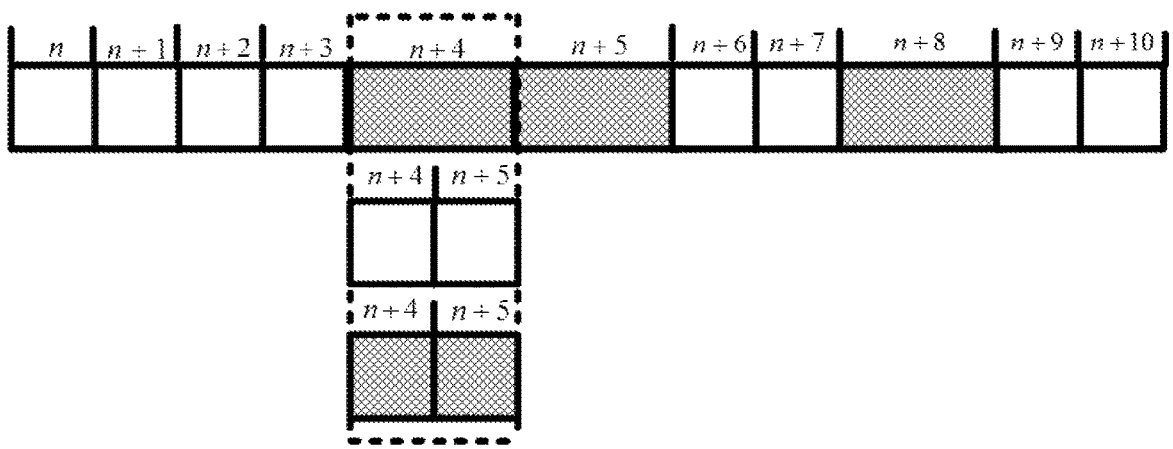
FIG. 2 is a schematic diagram illustrating a timing of an example 2, in accordance with an embodiment of the present disclosure.

FIG. 2 is a schematic diagram illustrating the granularity of example 2. Each block in FIG. 2~FIG. 9 represents a UL time-domain transmission unit, or a DL time-domain transmission unit, more particularly, which may be a UL time slot and a DL time slot. The block filled with shadows represents the UL time-domain transmission unit, and the block unfilled with shadows represents the DL time-domain transmission unit. The number on the box represents the specific number of the time-domain transmission unit, when numbered with granularity. It can be seen that, in FIG. 2, the time-domain length of the UL time-domain transmission unit is twice the time-domain length of the DL time-domain transmission unit. The time-domain length of granularity corresponding to the UL time-domain transmission unit is also twice the time-domain length of granularity corresponding to the DL time-domain transmission unit. In FIG. 2, each time-domain transmission unit is sequentially numbered, based on two granularities with different lengths of UL and DL.

In FIG. 2, the network side may configure the transmission direction of the time-domain transmission unit, UL numerology and DL numerology, and time-domain length of granularity for the terminal, by using high-level signaling.

Taking into account a dynamic Time Division Duplex (TDD), the number may be affected by a different Numerology of UL and DL. Thus, when the first time-domain transmission unit and the second time-domain transmission unit are dynamically variable, during indicating the timing between the first and second time-domain transmission units in the embodiment, in addition to indicating the offset value of the second time-domain transmission unit compared with the first time-domain transmission unit (that is, the starting position of the second time-domain transmission unit), the end position of the second time-domain transmission unit may be indicated by additional indication information. For example, for different UL and DL transmission units adopted within the dotted block of FIG. 2, different numbers may be resulted. For a time-domain transmission unit numbered (n+4), there are different end positions. Thus, the terminal may be helped to determine the specific position of the second time-domain transmission unit, by additionally indicating the end position.

Example 3

The numerology of UL transmission resources and the numerology of DL transmission resources have different symbol lengths, the same quantity of symbols, and different subcarrier spacing. Alternatively, the numerology of UL transmission resources and the numerology of DL transmission resources have the same symbol length, the same subcarrier spacing and different quantities of symbols.

That is, the symbol length in the numerology of the UL transmission resources is different from that in the numerology of the DL transmission resources, the quantity of symbols respectively corresponding to the time-domain transmission units of UL transmission resources and DL transmission resources is the same, and, the subcarrier spacing in the numerology of the UL transmission resources is different from that in the numerology of the DL transmission resources. Alternatively, the symbol length in the numerology of the UL transmission resources is the same as that in the numerology of the DL transmission resource, and the subcarrier spacing in the numerology of the UL transmission resources is the same as that in the numerology of the DL transmission resources, however, the quantity of symbols respectively corresponding to the time-domain transmission unit is different.

In the example, the granularity is a time-domain transmission unit corresponding to the numerology of the DL transmission resources.

For example, the timing of UL scheduling, or the ACK/NACK feedback timing of PUSCH/PDSCH is indicated, based on (n+k)*granularity. The granularity is related with DL numerology, the symbol length (7OS slot or 14OS slot), and so on. Here, each granularity is referred to as one TTI.

A) When the subcarrier spacing in the numerology of the DL transmission resources is W times of the subcarrier spacing in the numerology of the UL transmission resources, and the first time-domain transmission unit is located in a granularity numbered n, the second time-domain transmission unit is located in a granularity numbered (n+k0). When the first time-domain transmission unit is UL transmission resources, and the second time-domain transmission unit is DL transmission resources, for the timing between the first and second time-domain transmission units, a timer is started from the end position of the first time-domain transmission unit located by the granularity numbered n, in which W is an integer greater than 1, and may be an even number preferably. Foregoing preset position may be the starting position of the second time-domain transmission unit, that is, after configuring relevant parameter value, the granularity numbered (n+k0) is always located in a specific position of the second time-domain transmission unit, so as to simplify reception processing.

Figure 3:
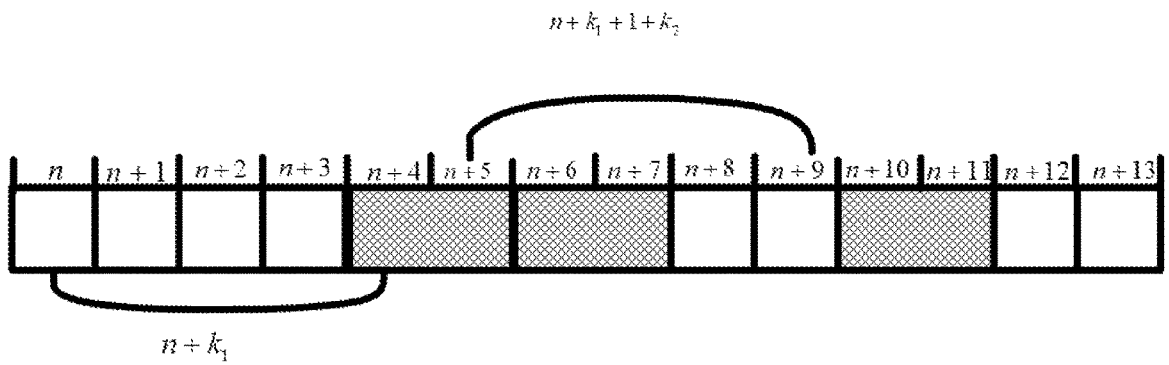
FIG. 3 is a schematic diagram illustrating a timing under scenario A of an example 3, in accordance with an embodiment of the present disclosure.

With reference to the example illustrated with FIG. 3, assume that UL subcarrier spacing is 15 KHz, and DL subcarrier spacing is 30 KHz, 1): regarding the timing between UL grant and scheduled PUSCH, taking into account the UL grant transmitted by the n-th TTI, a corresponding PUSCH transmission is transmitted in the $(n+K_1)$-th TTI. In the application, assume that the number of time-domain transmission unit starts from 0, in order to simplify processing, in the example, the PUSCH transmission is only allowed to appear in the starting position of the UL slot. The half-slot is not allowed to transmit the PUSCH. At this time, value of $k_1$ configured by high level needs to meet the following condition: $(n+k_1)$ is an even number.

2): regarding the timing between a PDSCH transmission and a corresponding ACK/NACK feedback, taking into account that the PDSCH is transmitted within the n-th TTI, subsequently, the corresponding ACK/NACK feedback is transmitted within the $(n+K_1)$-th TTI. For simplification, only the ACK/NACK feedback is allowed to appear at the starting position of the UL slot, and half-slot feedback is not allowed. At this time, the value of k1 configured by the high level needs to meet the following condition: $(n+k_1)$ is an even number.

3): regarding the timing between a PUSCH transmission and corresponding ACK/NACK feedback, taking into account that the PUSCH is transmitted within the $(n+k_1)$-th TTI, when calculating the time interval to the ACK/NACK feedback, a timer is started from the end position of the UL slot, subsequently, the corresponding ACK/NACK feedback is transmitted within the $(n+K_1+1+K_2)$-th TTI. At this time, the value of $k_2$ configured by the high level needs to meet the delay requirements, and there is no other restriction. Here, n, $k_1$ and $k_2$ are all integers greater than 1.

B) When the subcarrier spacing in the numerology of the UL transmission resources is W times the subcarrier spacing in the numerology of the DL transmission resources, and the first time-domain transmission unit is located in the granularity numbered n, the second time-domain transmission unit is located in the granularity numbered (n+k0), besides, when the first time-domain transmission unit is DL transmission resources, and the second time-domain transmission unit is UL transmission resources, the timing further includes: position indication information indicating that the second time-domain transmission unit is located in the granularity numbered (n+k0); besides, when the first time-domain transmission unit is UL transmission resources, and the second time-domain transmission unit is DL transmission resources, regarding the timing between the first and second time-domain transmission units, a timer is started from the end position of the granularity numbered n, in which W is an integer greater than 1, preferably, W is an even number, n and k0 are both integers greater than 1.

Figure 4:
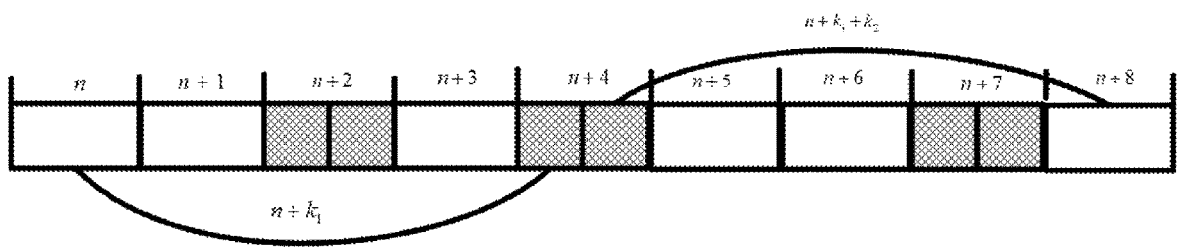
FIG. 4 is a schematic diagram illustrating a timing under scenario B of the example 3, in accordance with an embodiment of the present disclosure.

In the example illustrated with FIG. 4, UL subcarrier spacing is 30 KHz, and DL subcarrier spacing is 15 KHz.

1): Regarding the timing between UL grant and scheduled PUSCH, taking into account that the UL grant is transmitted within the n-th TTI, subsequently, a corresponding PUSCH transmission is transmitted within the $(n+K_1)$-th TTI. Since a UL slot length is less than a DL slot length, at this time, a 1 bit indication may be needed to be added, so as to determine which UL slot transmits the PUSCH transmission. At this time, the value of $k_1$ configured by high level needs to meet the delay requirements, and there is no other restriction.

2): Regarding the timing between a PDSCH transmission and a corresponding ACK/NACK feedback, taking into account that the PDSCH is transmitted within the n-th TTI, subsequently, a corresponding ACK/NACK feedback is transmitted within the $(n+K_1)$-th TTI. Since a UL slot length is less than a DL slot length, at this time, 1 bit indication needs to be added, so as to determine which UL slot transmits the ACK/NACK feedback. At this time, the value of $k_1$ configured by high level needs to meet the delay requirements, and there is no other restriction.

3): Regarding the timing between a PUSCH transmission and a corresponding ACK/NACK feedback, taking into account that the PUSCH is transmitted within the (n+K1)-th TTI, no matter the PUSCH is transmitted in which slot of the $(n+K_1)$-th TTI, when calculating the time interval to the ACK/NACK feedback, a timer is started from the end position of the second slot, and the ACK/NACK feedback is transmitted within $(n+k_1+k_2)$-th TTI. At this time, the value of $k_2$ configured by the high level needs to meet the delay requirements, and there is no other restriction.

Example 4

The numerology of UL transmission resources and the numerology of DL transmission resources have different symbol lengths, the same quantity of symbols, and different subcarrier spacing. Alternatively, the numerology of UL transmission resources and the numerology of DL transmission resources have the same symbol length, the same subcarrier spacing, and different quantities of symbols.

In the example, the granularity is a time-domain transmission unit corresponding to the numerology of the UL transmission resources.

For example, the timing of UL scheduling, or the ACK/NACK feedback timing of PUSCH/PDSCH is indicated, based on (n+k)*granularity. The granularity is related with UL numerology, granularity size (7OS slot or 14 OS slot), and so on. Each granularity is referred to as a TTI.

A) When subcarrier spacing in the numerology of DL transmission resources is W times the subcarrier spacing in the numerology of UL transmission resources, and a first time-domain transmission unit is located in a granularity numbered n, a second time-domain transmission unit is located in a granularity numbered (n+k0). Besides, when the first time-domain transmission unit is UL transmission resources, and the second time-domain transmission unit is DL transmission resources, the timing further includes: position indication information indicating that the second time-domain transmission unit is located in the granularity numbered (n+k0). Besides, when the first time-domain transmission unit is DL transmission resources, and the second time-domain transmission unit is UL transmission resources, regarding the timing between the first and second time-domain transmission units, a timer is started from the end position of the granularity numbered n, in which W is an integer greater than 1, preferably, W is an even number, n and k0 are both integers greater than 1.

Figure 5:
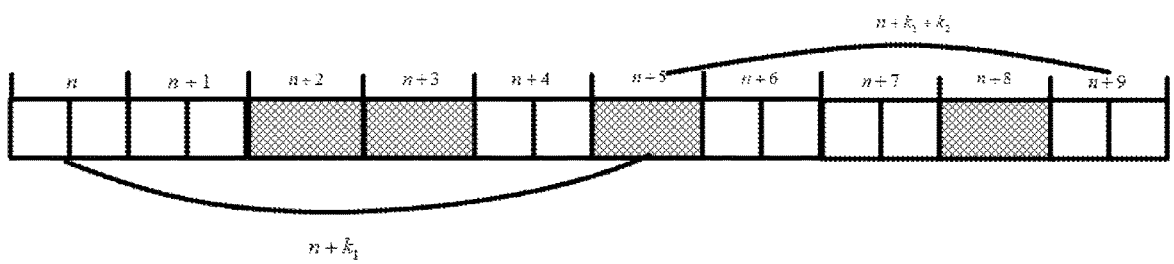
FIG. 5 is a schematic diagram illustrating a timing under scenario A of an example 4, in accordance with an embodiment of the present disclosure.

In the example illustrated with FIG. 5, UL subcarrier spacing is 15 KHz, and DL subcarrier spacing is 30 KHz.

1): Regarding the timing between UL grant and scheduled PUSCH, taking into account that the UL grant is transmitted within the n-th TTI, no matter which slot of the n-th TTI transmits the UL grant, when calculating the time interval to the PUSCH, a timer is started from the end position of the second slot, and the PUSCH transmission is transmitted within the $(n+K_1)$-th TTI. At this time, the value of $k_1$ configured by the high level needs to meet the delay requirements, and there is no other restriction.

2): Regarding the timing between a PDSCH transmission and a corresponding ACK/NACK feedback, taking into account that the PDSCH is transmitted within the n-th TTI, no matter the PDSCH is transmitted in which slot of the n-th TTI, when calculating the time interval to the ACK/NACK, a timer is started from the end position of the second slot, and the ACK/NACK feedback is transmitted within the $(n+K_1)$-th TTI. At this time, the value of $k_1$ configured by the high level needs to meet the delay requirements, and there is no other restriction.

3): Regarding the timing between a PUSCH transmission and a corresponding ACK/NACK feedback, taking into account that the PUSCH is transmitted within the $(n+K_1)$-th TTI, subsequently, the corresponding ACK/NACK feedback is transmitted within the $(n+K_1+K_2)$-th TTI. Since a DL slot length is less than a UL slot length, at this time, 1 bit indication needs to be added, so as to determine the ACK/NACK feedback is transmitted in which slot. At this time, the value of $k_2$ configured by the high-level needs to meet the delay requirements, and there is no other restriction.

B) When the subcarrier spacing in the numerology of UL transmission resources is W times the subcarrier spacing in the numerology of DL transmission resources, and the first time-domain transmission unit is located in a granularity numbered n, the second time-domain transmission unit is located in a granularity numbered (n+k0). Besides, when the first time-domain transmission unit is DL transmission resources, and the second time-domain transmission unit is UL transmission resources, the granularity numbered n is located in a preset first position of the first time-domain transmission unit. Regarding the timing between the first and second time-domain transmission units, a timer is started from the end position of the first time-domain transmission unit where the granularity numbered n is located. However, when the first time-domain transmission unit is UL transmission resources, and the second time-domain transmission unit is DL transmission resources, the granularity numbered (n+k) is located in a preset second position of the second time-domain transmission unit, in which W is an integer greater than 1, preferably, W is an even number, n and k0 are both integers greater than 1.

Figure 6:
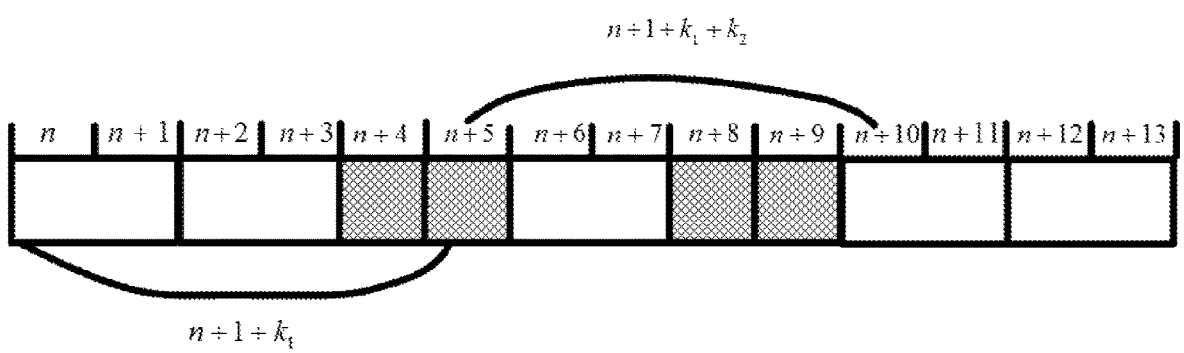
FIG. 6 is a schematic diagram illustrating a timing under scenario B of the example 4, in accordance with an embodiment of the present disclosure.

In the example illustrated with FIG. 6, UL subcarrier spacing is 30 KHz, and DL subcarrier spacing is 15 KHz.

1): Regarding the timing between UL grant and scheduled PUSCH, taking into account that the UL grant is transmitted within the n-th TTI, for simplification, it is only allowed the UL grant to appear at the starting position of the DL slot. And, it is not allowed to transmit a scheduling indication at half slot. At this time, when configuring the n-th TTI located by the scheduling, the high level configures that n must be an even number. When calculating a time interval to the PUSCH, a timer must be started from the end position of the DL slot. Subsequently, a corresponding PUSCH transmission is transmitted within $(n+1+K_1)$-th TTI. At this time, the value of $K_1$ configured by the high level should meet the delay requirements, and there is no other restriction.

2): Regarding the timing between PDSCH transmission and a corresponding ACK/NACK feedback, taking into account that the PDSCH is transmitted within the n-th TTI, for simplification, the PDSCH is only allowed to appear at the starting position of a DL slot. And, it is not allowed to transmit the PDSCH at half-slot. At this time, when configuring the n-th TTI located by the PDSCH, the high level configures that n must be an even number. When calculating a time interval to the ACK/NACK feedback, a timer should be started from the end position of the DL slot. Subsequently, the corresponding ACK/NACK feedback is transmitted within the $(n+1+K_1)$-th TTI. At this time, the value of $K_1$ configured by the high level meets the delay requirements, and there is no other restriction.

3): Regarding the timing between PUSCH transmission and a corresponding ACK/NACK feedback, taking into account that the PUSCH is transmitted within the $(n+1+K_1)$-th TTI, the corresponding ACK/NACK feedback is transmitted within the $(n+1+K_1+K_2)$-th TTI. For simplification, the ACK/NACK feedback is only allowed to appear at the starting position of the DL slot, and is not allowed to be transmitted at half-slot. At this time, the value of $K_2$ configured by the high level should meet the following condition: $(n+1+k_1+k_2)$ is an even number.

Example 5

The numerology of UL transmission resources and the numerology of DL transmission resources possess different symbol lengths, the same quantity of symbols, and different subcarrier spacing. Alternatively, the numerology of UL transmission resources and the numerology of DL transmission resources possess the same symbol length, the same subcarrier spacing, and different quantities of symbols.

In the example, the granularity is a time-domain transmission unit corresponding to one Numerology. Besides, time-domain length of the time-domain transmission unit corresponding to the numerology of UL and DL transmission resources is an integer multiple of that of the time-domain transmission unit, which corresponds to the numerology.

For example, the timing of UL scheduling, or the ACK/NACK feedback timing of PUSCH/PDSCH is indicated, based on (n+k)*granularity. The granularity is relevant with a certain reference numerology, and a granularity scheduled by such Reference Numerology. Assume that the reference numerology is 60 KHz, each granularity is referred to as one TTI.

A) When the subcarrier spacing in the numerology of DL transmission resources is W times of subcarrier spacing, which is in the numerology of UL transmission resources, and a first time-domain transmission unit is located in a granularity numbered n, a second time-domain transmission unit is located in a granularity numbered (n+k0). Besides, when the first time-domain transmission unit is DL transmission resource, and the second time-domain transmission unit is UL transmission resource, the granularity numbered n is located in a preset third position of the first time-domain transmission unit, and the granularity numbered (n+k0) is located in a preset fourth position of the second time-domain transmission unit. Besides, regarding the timing between the first time-domain transmission unit and the second time-domain transmission unit, a timer is started from the end position of the first time-domain transmission unit, where the granularity numbered n is located, in which W is an integer greater than 1. Preferably, W is an even number. However, when the first time-domain transmission unit is UL transmission resource, and the second time-domain transmission unit is DL transmission resource, a granularity numbered (n+k0) is located in a preset fifth position of the second time-domain transmission unit. Besides, regarding the timing between the first and second time-domain transmission units, a timer is started from the end position of the first time-domain transmission unit, where the granularity numbered n is located, in which W is an even number greater than 1, n and k0 are both integers greater than 1.

Figure 7:
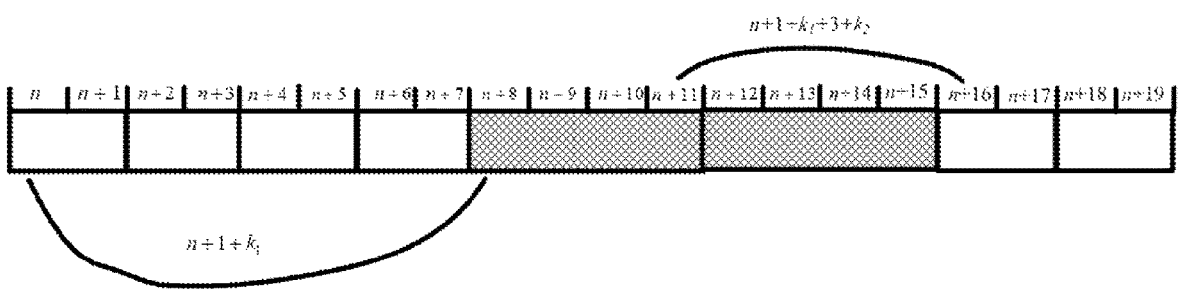
FIG. 7 is a schematic diagram illustrating a timing under scenario A of an example 5, in accordance with an embodiment of the present disclosure.

In the example illustrated with FIG. 7, UL subcarrier spacing is 15 KHz, and DL subcarrier spacing is 30 KHz.

1): Regarding the timing between UL grant and a scheduled PUSCH, taking into account that the UL grant is transmitted within the n-th TTI, for simplification, the UL grant is only allowed to appear at the starting position of the DL slot. It is not allowed to transmit a scheduling indication at half slot. At this time, when configuring the n-th TTI located by the scheduling, the high level configures that n must be an even number. When calculating a time interval to the PUSCH, a timer must be started from the end position of the DL slot. Subsequently, the corresponding PUSCH transmission is transmitted within the $(n+1+K_1)$-th TTI. For simplification, the PUSCH transmission is only allowed to appear at the starting position of the UL slot. It is not allowed to transmit the PUSCH at half slot. At this time, the value of $K_1$ configured by the high level should meet the following condition: $(n+1+k_1)$ is a multiple of 4.

2): Regarding the timing between PDSCH transmission and a corresponding ACK/NACK feedback, taking into account that the PDSCH is transmitted within the n-th TTI, for simplification, the PDSCH is only allowed to appear at the starting position of the DL slot. It is not allowed to transmit the PDSCH at half slot. At this time, when configuring the n-th TTI located by the scheduling, the high level configures that n must be an even number. When calculating a time interval to the corresponding ACK/NACK feedback, a timer must be started from the end position of the DL slot. Subsequently, the corresponding ACK/NACK feedback is transmitted within the $(n+1+K_1)$-th TTI. Meanwhile, for simplification, the ACK/NACK feedback is only allowed to appear at the starting position of the UL slot. It is not allowed to feed back ACK/NACK at half slot. At this time, the value of $K_1$ configured by the high level should meet the following condition: $(n+1+k_1)$ is a multiple of 4.

3): Regarding the timing between PUSCH transmission and a corresponding ACK/NACK feedback, taking into account that the PUSCH is transmitted within the $(n+1+K_1)$-th TTI, when calculating a time interval to the ACK/NACK feedback, a timer must be started from the end position of the UL slot. Subsequently, the corresponding ACK/NACK feedback is transmitted within the $(n+1+K_1+3+K_2)$-th TTI. For simplification, the ACK/NACK feedback is only allowed to appear at the starting position of the DL slot. It is not allowed to feed back the ACK/NACK at half slot. At this time, the value of $K_2$ configured by the high level should meet the following condition: $(n+1+k_1+3+k_2)$ is an even number.

B) When the subcarrier spacing in the numerology of UL transmission resources is W times of that in the numerology of DL transmission resources, the first time-domain transmission unit is located in a granularity numbered n, and the second time-domain transmission unit is located in a granularity numbered (n+k0). Besides, when the first time-domain transmission unit is DL transmission resource, and the second time-domain transmission unit is UL transmission resource, a granularity numbered n is located in a preset third position of the first time-domain transmission unit, and a granularity numbered (n+k0) is located in a preset fourth position of the second time-domain transmission unit. Regarding the timing between the first and second time-domain transmission units, a timer is started from the end position of the first time-domain transmission unit, where the granularity numbered n is located, in which W is an integer greater than 1, preferable, W is an even number, n and k0 are integers greater than 1.

Figure 8:
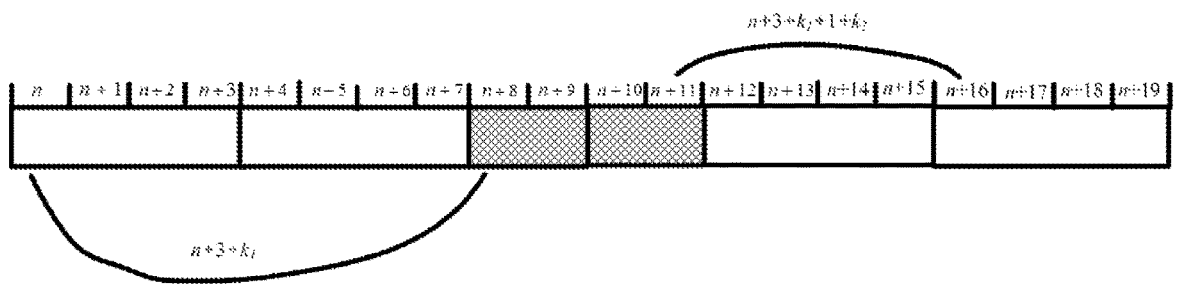
FIG. 8 is a schematic diagram illustrating a timing under scenario B of the example 5, in accordance with an embodiment of the present disclosure.
Figure 9:
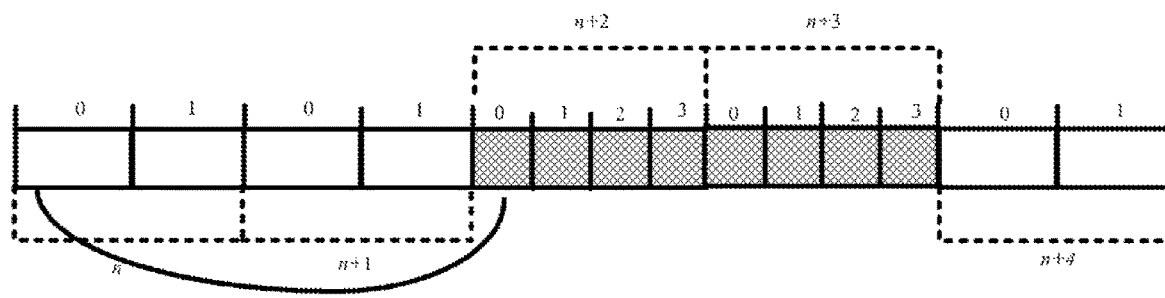
FIG. 9 is a schematic diagram illustrating a timing of an example 6, in accordance with an embodiment of the present disclosure.

In the example illustrated with FIG. 8, UL subcarrier spacing is 30 KHz, and DL subcarrier spacing is 15 KHz.

1): Regarding the timing between UL grant and a scheduled PUSCH, taking into account that the UL grant is transmitted within the n-th TTI, for simplification, the UL grant is only allowed to appear at the starting position of the DL slot. It is not allowed to transmit a scheduling indication at other position of the DL slot. At this time, when configuring the n-th TTI located by the scheduling, the high level configures that n must be a multiple of 4. When calculating a time interval to the PUSCH, a timer must be started from the end position of the DL slot. Subsequently, the corresponding PUSCH transmission is transmitted within the $(n+3+K_1)$-th TTI. Meanwhile, for simplification, the PUSCH transmission is only allowed to appear at the starting position of the UL slot. It is not allowed to transmit the PUSCH at half slot. At this time, the value of $K_1$ configured by the high level should meet the following condition: $(n+3+k_1)$ is an even number.

2): Regarding the timing between PDSCH transmission and a corresponding ACK/NACK feedback, taking into account that the PDSCH is transmitted within the n-th TTI, for simplification, the PDSCH is only allowed to appear at the starting position of the DL slot. It is not allowed to transmit the PDSCH at other position of the DL slot. At this time, when configuring the n-th TTI located by the scheduling, the high level configures that n must be a multiple of 4. When calculating a time interval to the corresponding ACK/NACK feedback, a timer must be started from the end position of the DL slot. Subsequently, the corresponding ACK/NACK feedback is transmitted within the $(n+3+K_1)$-th TTI. Meanwhile, for simplification, the ACK/NACK feedback is only allowed to appear at the starting position of the UL slot. It is not allowed to feed back the ACK/NACK at half slot. At this time, the value of $K_1$ configured by the high level should meet the following condition: $(n+3+k_1)$ is an even number.

3): Regarding the timing between PUSCH transmission and a corresponding ACK/NACK feedback, taking into account that the PUSCH is transmitted within the $(n+3+K_1)$-th TTI, when calculating a time interval to the ACK/NACK feedback, a timer must be started from the end position of the UL slot. Subsequently, the corresponding ACK/NACK feedback is transmitted within the $(n+3+K_1+1+K_2)$-th TTI. For simplification, the ACK/NACK feedback is only allowed to appear at the starting position of the DL slot. It is not allowed to feed back the ACK/NACK at other position of the DL slot. At this time, the value of $K_2$ configured by the high level should meet the following condition: $(n+3+k_1+1+k_2)$ is a multiple of 4. Here, n, $k_1$, $k_2$ are all integers greater than 1.

Example 6

The numerology of UL transmission resource and the numerology of DL transmission resource possess different symbol lengths, the same quantity of symbols, and different subcarrier spacing. Alternatively, the numerology of the UL transmission resource and the numerology of the DL transmission resource possess the same symbol length, the same subcarrier spacing, and different quantities of symbols.

In the example, a two-level granularity representation is used. Specifically, the timing includes: taking a first-level granularity as a unit, compared with the first time-domain transmission unit, an offset value of the second time-domain transmission unit is $k_3$. And, taking the first-level granularity as a unit, an offset value of the second time-domain transmission unit in the first-level granularity is $k_4$.

For example, the timing of UL scheduling, or the ACK/NACK feedback timing of PUSCH/PDSCH is indicated, based on (n+k)*granularity. The granularity is divided into two levels. The first-level granularity is length of one subframe, i.e., 1 ms. The second-level granularity is specific indication of respective numerology of UL and DL.

The above-mentioned scheduling method utilizes the 1 ms fixed subframe length in existing LTE. For respective numerology with each subframe, time slots are numbered separately to reduce cost. Taking FIG. 9 as an example, taking into account that the UL grant is transmitted within the n-th TTI, a corresponding PUSCH is transmitted within subframe (n+k$_3$) and time slot k$_4$. Here, n, k$_3$ and k$_4$ are all integers greater than 1.

In foregoing examples 3~6, when considering dynamic TDD situation, the terminal may be informed about current UL and DL numerologies, as well as transmission direction of the time-domain transmission unit through Downlink Control Information (DCI), so as to help the terminal to determine a corresponding HARQ timing.

As can be seen from the above, in the information transmission method of wireless communication system provided by embodiments of the present disclosure, a granularity is provided, when UL and DL adopt different numerologies. Taking the granularity as a unit, a corresponding timing is provided, which provides a basis for 5G NR scheduling design.

Figure 10:
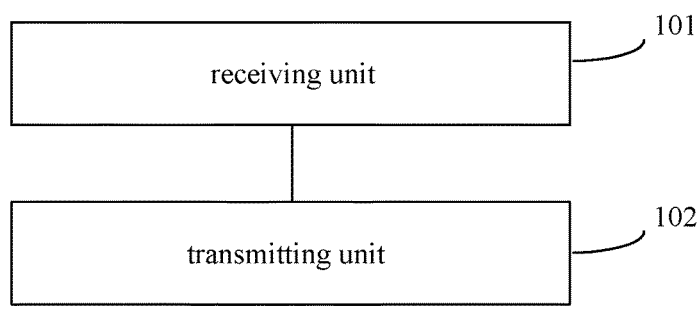
FIG. 10 is a schematic diagram illustrating a data transmission device in a wireless communication system, in accordance with an embodiment of the present disclosure.

Based on the methods provided above, an embodiment of the present disclosure also provides a device for implementing above method. Referring to FIG. 10, an embodiment of the present disclosure provides a transmission device of wireless communication system. The device may be a base station or a terminal. As shown in FIG. 10, the device includes a receiving unit 101 and a transmitting unit 102.

The receiving unit 101 is configured to receive first information, which is transmitted by a communication peer end at a first time-domain transmission unit.

The transmitting unit 102 is configured to transmit second information to the communication peer end at a second time-domain transmission unit.

Each time-domain transmission unit corresponds to UL or DL transmission resources. The UL and DL transmission resources possess different Numerologies. The timing between the first and second time-domain transmission units is demonstrated by a granularity, which corresponds to a Numerology.

Here, the numerology includes at least one of subcarrier spacing, symbol length, or quantity of symbols in the time-domain transmission unit. The Numerology is different from the numerology of DL transmission resources. Alternatively, the Numerology is different from the numerology of UL transmission resources. Still alternatively, the Numerology is different from respective numerology of UL and DL transmission resource.

Optionally, the timing includes: compared with the first time-domain transmission unit, an offset value of the second time-domain transmission unit is k0. The offset value k0 is denoted with the granularity as a unit.

Optionally, when the communication peer end is a terminal, the device further includes a configuring unit.

The configuring unit is configured to configure in advance at least one of: the timing, the numerology of UL transmission resources, the numerology of DL transmission resources, the transmission direction of time-domain transmission unit, or granularity to the terminal.

Optionally, the transmitting unit includes a determining unit, a transmitting and processing unit.

The determining unit is configured to determine a second number, based on the granularity located by the first information and the timing.

The transmitting and processing unit is configured to transmit the second information at the second time-domain transmission unit, which corresponds to the second number.

Corresponding to above example 1, a first product of symbol length in the numerology of UL transmission resources and subcarrier spacing is equal to a second product, which is a product of symbol length in the numerology of DL transmission resources and subcarrier spacing. Besides, the time-domain transmission unit respectively corresponding to the numerologies of UL and DL transmission resources possesses the same time-domain length. The granularity is a time-domain transmission unit corresponding to the numerology of UL or DL transmission resources.

Corresponding to above example 2, the numerology of UL transmission resources and the numerology of DL transmission resources possess different symbol lengths, the same quantity of symbols, and different subcarrier spacing. Alternatively, the numerology of UL transmission resources and the numerology of DL transmission resources possess the same symbol length, the same subcarrier spacing, and different quantities of symbols. The granularity includes a time-domain transmission unit corresponding to the numerology of DL transmission resources, and another time-domain transmission unit corresponding to the numerology of UL transmission resources. Preferably, when the first and second time-domain transmission units are dynamically variable, the timing further includes indication information, which indicates the end position of the second time-domain transmission unit.

Corresponding to above example 3, the numerology of UL transmission resources and the numerology of DL transmission resources possess different symbol lengths, the same quantity of symbols, and different subcarrier spacing. Alternatively, the numerology of UL transmission resources and the numerology of DL transmission resources possess the same symbol length, the same subcarrier spacing, and different quantities of symbols. The granularity is a time-domain transmission unit, which corresponds to the numerology of DL transmission resources.

Optionally, when the subcarrier spacing in the numerology of DL transmission resources is W times of that in the numerology of UL transmission resources, or, the quantity of symbols in a time-domain transmission unit corresponding to the numerology of UL transmission resources is W times of that in another time-domain transmission unit, which corresponds to the numerology of DL transmission resources, if the first time-domain transmission unit is located in a granularity numbered n, the second time-domain transmission unit is located in a granularity numbered (n+k0), besides, when the first time-domain transmission unit is DL transmission resources, and, the second time-domain transmission unit is UL transmission resources, the granularity numbered (n+k0) is located in a preset position of the second time-domain transmission unit. Besides, when the first time-domain transmission unit is UL transmission resources, and the second time-domain transmission unit is DL transmission resources, regarding the timing between the first and second time-domain transmission units, a timer is started from the end position of the first time-domain transmission unit where the granularity numbered n is located.

When the subcarrier spacing in the numerology of UL transmission resources is W times of that in the numerology of DL transmission resources, or, the quantity of symbols in a time-domain transmission unit corresponding to the numerology of DL transmission resources is W times of that in another time-domain transmission unit, which corresponds to the numerology of UL transmission resources, if the first time-domain transmission unit is located in a granularity numbered n, and the second time-domain transmission unit is located in a granularity numbered (n+k0), the first time-domain transmission unit is DL transmission resources, and the second time-domain transmission unit is UL transmission resources, the timing further includes:

position indication information of the second time-domain transmission unit in the granularity numbered (n+k0). Besides, when the first time-domain transmission unit is UL transmission resources, and the second time-domain transmission unit is DL transmission resource, regarding the timing between the first and second time-domain transmission units, a timer is started from the end position of the granularity numbered n, in which W is an integer greater than 1, preferably, W is an even number.

Corresponding to above example 4, the numerology of UL transmission resources and the numerology of DL transmission resources possess different symbol lengths, the same quantity of symbols, and different subcarrier spacing, or, the numerology of UL transmission resources and the numerology of DL transmission resources possess the same symbol length, the same subcarrier spacing, and different quantities of symbols. The granularity is a time-domain transmission unit, which corresponds to the numerology of UL transmission resources.

Optionally, when the subcarrier spacing in the numerology of DL transmission resources is W times of that in the numerology of UL transmission resources, or, the quantity of symbols in a time-domain transmission unit corresponding to the numerology of UL transmission resources is W times of that in another time-domain transmission unit, which corresponds to the numerology of DL transmission resources, if the first time-domain transmission unit is located in a granularity numbered n, the second time-domain transmission unit is located in a granularity numbered (n+k0), besides, the first time-domain transmission unit is UL transmission resources, and the second time-domain transmission unit is DL transmission resources, the timing further includes: position indication information of the second time-domain transmission unit in the granularity numbered (n+k0). When the first time-domain transmission unit is DL transmission resources, and the second time-domain transmission unit is UL transmission resources, regarding the timing between the first and second time-domain transmission units, a timer is started from the end position of the granularity numbered n.

When the subcarrier spacing in the numerology of UL transmission resources is W times of that in the numerology of DL transmission resources, or, the quantity of symbols in a time-domain transmission unit corresponding to the numerology of DL transmission resources is W times of that in another time-domain transmission unit, which corresponds to the numerology of UL transmission resources, if the first time-domain transmission unit is located in the granularity numbered n, the second time-domain transmission unit is located in the granularity numbered (n+k0), the first time-domain transmission unit is DL transmission resources, and the second time-domain transmission unit is UL transmission resources, the granularity numbered n is located in a preset first position of the first time-domain transmission unit, regarding the timing between the first and second time-domain transmission units, a timer is started from the end position of the first time-domain transmission unit, where the granularity numbered n is located. When the first time-domain transmission unit is UL transmission resources, and the second time-domain transmission unit is DL transmission resources, a granularity numbered (n+k) is located in a preset second position of the second time-domain transmission unit, in which W is an integer greater than 1, preferably, W is an even number.

Corresponding to above example 5, the numerology of UL transmission resources and the numerology of DL transmission resources possess different symbol lengths, the same quantity of symbols, and different subcarrier spacing, or, the numerology of UL transmission resources and the numerology of DL transmission resources possess the same symbol length, the same subcarrier spacing, and different quantities of symbols. The granularity is a time-domain transmission unit corresponding to one Numerology. Besides, a time-domain length of a time-domain transmission unit respectively corresponding to the numerologies of UL and DL transmission resources is an integer multiple of that in another time-domain transmission unit, which corresponds to the Numerology.

Optionally, when the subcarrier spacing in the numerology of DL transmission resources is W times of that in the numerology of UL transmission resources, or, the quantity of symbols in a time-domain transmission unit corresponding to the numerology of UL transmission resources is W times of that in another time-domain transmission unit, which corresponds to the numerology of DL transmission resources, or, the subcarrier spacing in the numerology of the UL transmission resources is W times of that in the numerology of the DL transmission resources, or, the quantity of symbols in a time-domain transmission unit corresponding to the numerology of DL transmission resources is W times of that in another time-domain transmission unit, which corresponds to the numerology of UL transmission resources, if the first time-domain transmission unit is located in the granularity numbered n, the second time-domain transmission unit is located in the granularity numbered (n+k0), besides, the first time-domain transmission unit is DL transmission resources, and the second time-domain transmission unit is UL transmission resources, the granularity numbered n is located in a preset third position of the first time-domain transmission unit, the granularity numbered (n+k0) is located in a preset fourth position of the second time-domain transmission unit. Regarding the timing between the first and second time-domain transmission units, a timer is started from the end position of the first time-domain transmission unit, where the granularity numbered n is located. When the first time-domain transmission unit is UL transmission resources, and the second time-domain transmission unit is DL transmission resources, the granularity numbered (n+k0) is located in a preset fifth position of the second time-domain transmission unit. Regarding the timing between the first and second time-domain transmission units, a timer is started from the end position of the first time-domain transmission unit, wherein the granularity numbered n is located, in which W is an integer greater than 1, preferably, W is an even number.

Corresponding to above example 6, the numerology of UL transmission resources and the numerology of DL transmission resources possess different symbol lengths, the same quantity of symbols, and different subcarrier spacing, or, the numerology of UL transmission resources and the numerology of DL transmission resources possess the same symbol length, the same subcarrier spacing, and different quantities of symbols. The timing includes: taking a first-level as a unit, compared with the first time-domain transmission unit, an offset value of the second time-domain transmission unit is $k_1$; and, taking the first-level granularity as a unit, an offset value of the second time-domain transmission unit in the first-level granularity is $k_2$.

Figure 11:
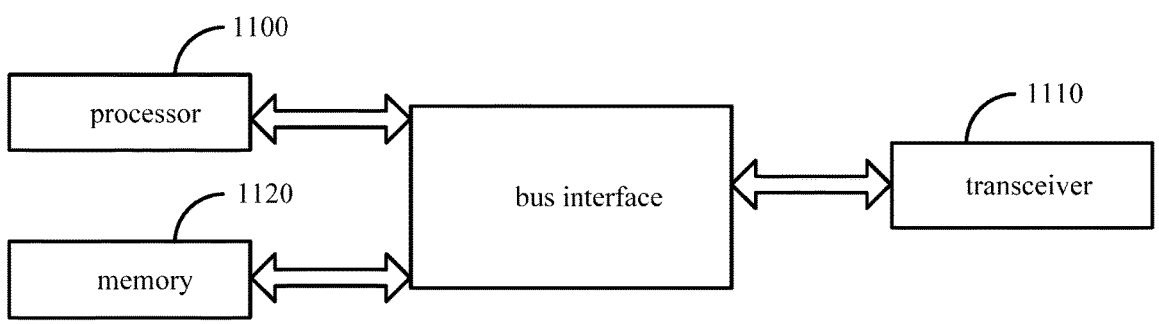
FIG. 11 is a schematic diagram illustrating structure of an electronic device, in accordance with an embodiment of the present disclosure.

With reference to FIG. 11, FIG. 11 is a schematic diagram illustrating structure of a transmission device in a wireless communication system, in accordance with an embodiment of the present disclosure. The electronic device may be a terminal or a base station. The electronic device includes: a processor 1100, a memory 1120 connected to the processor 1100 via a bus interface, and a transceiver 1110 connected to the processor 1100 via the bus interface. The memory 1120 is configured to store program and data used by the processor when performing operations, transmit data information or pilots through the transceiver 1110, and receive a UL control channel through the transceiver 1110, when the processor 1100 calls and executes program and data stored in the memory 1120.

Specifically, the processor 1100 is configured to read program from the memory 1120, and more particularly to perform the following functions: receive first information transmitted by a communication peer end at a first time-domain transmission unit; transmit second information to the communication peer end at a second time-domain transmission unit; in which each time-domain transmission unit corresponds to UL or DL transmission resources, the UL and DL transmission resources possess different Numerologies. The timing between the first and second time-domain transmission units is represented by a granularity as a unit, in which the granularity corresponds to a Numerology.

Here, the timing includes: compared with the first time-domain transmission unit, an offset value of the second time-domain transmission unit is k0, in which the offset value k0 is represented by the granularity as a unit.

The transceiver 1110 is configured to receive and transmit data under the control of the processor 1100.

In FIG. 11, bus architecture may include any number of interconnected buses and bridges. Specifically, various circuits of one or more processors represented by the processor 1100 and memory represented by the memory 1120 are linked together. The bus architecture may also link various other circuits, such as peripherals, voltage regulators, and power management circuits, as is known in the art. Thus, no further description is provided in the present disclosure. The bus interface provides an interface. The transceiver 1110 may be multiple components, i.e., including a transmitter and a receiver, which provides units for communicating with various other devices on a transmission medium. The processor 1100 takes charge of managing bus architecture and general processing. The memory 1120 may store data used by the processor 1100 when performing operations.

Specifically, the processor 1100 is further configured to configure at least one of the timing, the numerology of UL transmission resources, the numerology of DL transmission resources, transmission direction of the time-domain transmission unit, or the granularity to the terminal.

Specifically, the processor 1100 is further configured to determine a second number, based on a first number of the granularity located by the first information, and transmit the second information at a second time-domain transmission unit corresponding to the second number.

An embodiment of the present disclosure also provides a computer readable storage medium, which stores a computer program, that when executed by the processor, causing the processor to perform method blocks of any foregoing method embodiment.

Persons having ordinary skill in the art may learn that, units and algorithm blocks of each example described by embodiments of the application may be implemented in electronic hardware, or in a combination of computer software and electronic hardware. Whether these functions are performed by hardware or software depends on specific application and design constraints of technical solutions. For each specific application, a person skilled in the art may adopt a different method to implement the described functions. However, such implementation should not be considered to go beyond the scope of the application.

Persons having ordinary skill in the art may clearly learn that, for convenience and conciseness of description, the specific working process of above-described system, device and unit may refer to corresponding process of foregoing method embodiments, which is not repeated here.

In the embodiments of the application, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the application.

In addition, in each embodiment of the application, various functional units may be integrated into a processing unit. Alternatively, each unit physically exists alone. Still alternatively, two or more units may be integrated into one unit.

When the functions are implemented in the form of software functional unit, which is sold or used as an independent product, such software functional unit may be stored in a computer readable storage medium. Based on such understandings, the technical solution of the application, or, a part contributing to the prior art, or a part of the technical solution may be embodied in the form of a software product. The computer software produce is stored in one storage medium, including several instructions to enable a computer device (may be a Personal Computer (PC), a server, or a network device, etc.) to implement all the blocks, or some blocks in the method of each embodiment of the application. Foregoing storage medium includes various media that can store program codes, such as a U disk, a mobile hard disk, an ROM, an RAM, a disk, or a Compact Disk (CD), and so on.

Foregoing is only specific implementations of the present disclosure. However, protection scope of the present disclosure is not limited. Any changes or substitutions that are obvious to those skilled in the art within the scope of the present disclosure are covered by the scope of the present disclosure. Therefore, the protection scope of the present disclosure should be determined by the scope of the claims.

What is claimed is:

1. A method for transmitting information in a wireless communication system, comprising:
receiving first information transmitted by a communication peer end at a first time-domain transmission unit; and
transmitting second information to the communication peer end at a second time-domain transmission unit;
wherein each time-domain transmission unit corresponds to uplink (UL) or downlink (DL) transmission resources, the UL and DL transmission resources possess different numerologies, timing between the first and second time-domain transmission units is represented by a granularity, which corresponds to a reference numerology;
wherein transmitting the second information to the communication peer end at the second time-domain transmission unit comprises:
determining a second number, based on a first number of a granularity which corresponds to the reference numerology and is located by the first information and the timing; and,
transmitting the second information at the second time-domain transmitting unit corresponding to the second number.

2. The method according to claim 1, wherein the numerology comprises at least one of subcarrier spacing, a symbol length, quantity of symbols in a time-domain transmission unit.

3. The method according to claim 1, wherein the reference numerology is different from the numerology of the DL transmission resources, or, the reference numerology is different from the numerology of the UL transmission resources, or, the reference numerology is different from the respective numerology of the UL and DL transmission resources.

4. The method according to claim 1, wherein the timing comprises an offset value of the second time-domain transmission unit compared with the first time-domain transmission unit, and the offset value is represented by the granularity which corresponds to the reference numerology.

5. The method according to claim 1, wherein when the communication peer end is a base station, the method further comprises:
configuring in advance at least one of the timing, a numerology of the UL transmission resources, a numerology of the DL transmission resources, a transmission direction of a time-domain transmission unit, or a granularity which corresponds to the reference numerology to the terminal.

6. The method according to claim 1, wherein the time-domain transmission unit respectively corresponding to the numerology of UL and DL transmission resources possesses the same time-domain length, and the granularity which corresponds to the reference numerology is a time-domain transmission unit corresponding to the numerology of the UL or DL transmission resources.

7. The method according to claim 1, wherein the numerology of the UL transmission resources and the numerology of the DL transmission resources possess different symbol lengths, the same quantity of symbols and different subcarrier spacing, or,
the numerology of the UL transmission resources and the numerology of the DL transmission resources possess the same symbol length, the same subcarrier spacing, and different quantities of symbols;
wherein the granularity which corresponds to the reference numerology comprises a time-domain transmission unit corresponding to the numerology of the DL transmission resources, and a time-domain transmission unit corresponding to the numerology of the UL transmission resources.

8. The method according to claim 1, wherein the numerology of the UL transmission resources and the numerology of the DL transmission resources possess different symbol lengths, the same quantity of symbols, and different subcarrier spacing; or,
the numerology of the UL transmission resources and the numerology of the DL transmission resources possess the same symbol length, the same subcarrier spacing, and different quantities of symbols; and,
the granularity which corresponds to the reference numerology is a time-domain transmission unit corresponding to the numerology of the DL transmission resources.

9. The method according to claim 8, wherein when the subcarrier spacing in the numerology of the DL transmission resources is W times of that in the numerology of the UL transmission resources, or, the quantity of symbols in a time-domain transmission unit corresponding to the numerology of the UL transmission unit is W times of that in a time-domain transmission unit, which corresponds to the numerology of the DL transmission resources,
the first time-domain transmission unit is located in a granularity which corresponds to the reference numerology and is numbered n, and the second time-domain transmission unit is located in a granularity which corresponds to the reference numerology and is numbered (n+k0); or, when the first time-domain transmission unit is the DL transmission resources, and the second time-domain transmission unit is the UL transmission resources, the granularity which corresponds to the reference numerology and is numbered (n+k0) is located in a preset position of the second time-domain transmission unit; or,
when the first time-domain transmission unit is the UL transmission resources, and the second time-domain transmission unit is the DL transmission resources, regarding timing between the first and second time-domain transmission units, a timer is started from an end position of the first time-domain transmission unit, where the granularity which corresponds to the reference numerology and is numbered n is located;
when the subcarrier spacing in the numerology of the UL transmission resources is W times of that in the numerology of the DL transmission resources, or, the quantity of symbols in the time-domain transmission unit corresponding to the numerology of the DL transmission resources is W times of that in the time-domain transmission unit, which corresponds to the numerology of the UL transmission resources,
the first time-domain transmission unit is located in the granularity which corresponds to the reference numerology and is numbered n, the second time-domain transmission unit is located in the granularity which corresponds to the reference numerology and is numbered (n+k0); or, when the first time-domain transmission unit is the DL transmission resources, and the second time-domain transmission unit is the UL transmission resources, the timing further comprises: position indication information of the second time-domain transmission unit in the granularity which corresponds to the reference numerology and is numbered (n+k0); or, when the first time-domain transmission unit is the UL transmission unit, and the second time-domain transmission unit is the DL transmission resources, regarding the timing between the first and second time-domain transmission units, a timer is started from the end position of the granularity which corresponds to the reference numerology and is numbered n;
wherein W is an even number greater than 1, n and k0 are both integers greater than 1.

10. The method according to claim 1, wherein the numerology of the UL transmission resources and the numerology of the DL transmission resources possess different symbol lengths, the same quantity of symbols, and different subcarrier spacing; or, the numerology of the UL transmission resources and the numerology of the DL transmission resources possess the same symbol length, the same subcarrier spacing, and different quantities of symbols;

wherein the granularity which corresponds to the reference numerology is a time-domain transmission unit corresponding to the numerology of the UL transmission resources.

11. The method according to claim 10, wherein when the subcarrier spacing in the numerology of the DL transmission resources is W times of that in the numerology of the UL transmission resources, or, the quantity of symbols in a time-domain transmission unit corresponding to the numerology of the UL transmission resources is W times of that in another time-domain transmission unit, which corresponds to the numerology of the DL transmission resources, the first time-domain transmission unit is located in a granularity which corresponds to the reference numerology and is numbered n, the second time-domain transmission unit is located in a granularity which corresponds to the reference numerology and is numbered (n+k0); or, when the first time-domain transmission unit is the UL transmission resources, and the second time-domain transmission unit is the DL transmission resources, the timing further comprises: position indication information of the second time-domain transmission unit in the granularity which corresponds to the reference numerology and is numbered (n+k0); or, when the first time-domain transmission unit is the DL transmission resources, and the second time-domain transmission unit is the UL transmission resources, regarding the timing between the first and second time-domain transmission units, a timer is started from an end position of the granularity which corresponds to the reference numerology and is numbered n;

when the subcarrier spacing in the numerology of the UL transmission resources is W times of that in the numerology of the DL transmission resources, or, the quantity of symbols in the time-domain transmission unit corresponding to the numerology of the DL transmission resources is W times of that in the time-domain transmission unit, which corresponds to the numerology of the UL transmission resources, the first time-domain transmission unit is located in the granularity which corresponds to the reference numerology and is numbered n, and the second time-domain transmission unit is located in the granularity which corresponds to the reference numerology and is numbered (n+k0); or, when the first time-domain transmission unit is the DL transmission resources, and the second time-domain transmission unit is the UL transmission resources, the granularity which corresponds to the reference numerology and is numbered n is located in a preset first position of the first time-domain transmission unit, regarding the timing between the first and second time-domain transmission units, a timer is started from the end position of the first time-domain transmission unit, where the granularity which corresponds to the reference numerology and is numbered n is located; or, when the first time-domain transmission unit is the UL transmission resources, and the second time-domain transmission unit is the DL transmission resources, the granularity which corresponds to the reference numerology and is numbered (n+k0) is located in a preset second position of the second time-domain transmission unit;

wherein W is an even number greater than 1, n and k0 are both integers greater than 1.

12. The method according to claim 1, wherein the numerology of the UL transmission resources and the numerology of the DL transmission resources possess different symbol lengths, the same quantity of symbols, and different subcarrier spacing; or, the numerology of the UL transmission resources and the numerology of the DL transmission resources possess the same symbol length, the same subcarrier spacing, and different quantities of symbols; and, the granularity which corresponds to the reference numerology is a time-domain transmission unit corresponding to a reference numerology, and, a time-domain length of a time-domain transmission unit respectively corresponding to the numerology of the UL and DL transmission resources is an integer multiple of that of the time-domain transmission unit corresponding to the Numerology.

13. The method according to claim 12, wherein when the subcarrier spacing in the numerology of the DL transmission resources is W times of that in the numerology of the UL transmission resources, or, the quantity of symbols in a time-domain transmission unit corresponding to the numerology of the UL transmission resources is W times of that in a time-domain transmission unit, which corresponds to the numerology of the DL transmission resources, or, the subcarrier spacing in the numerology of the UL transmission resources is W times of that in the numerology of the DL transmission resources, or, the quantity of symbols in the time-domain transmission unit corresponding to the numerology of the DL transmission resources is W times of that in the time-domain transmission unit, which corresponds to the numerology of the UL transmission resources;

the first time-domain transmission unit is located in a granularity which corresponds to the reference numerology and is numbered n, the second time-domain transmission unit is located in a granularity which corresponds to the reference numerology and is numbered (n+k0); or, when the first time-domain transmission unit is the DL transmission resources, and the second time-domain transmission unit is the UL transmission resources, the granularity which corresponds to the reference numerology and is numbered n is located in a preset third position of the first time-domain transmission unit, and the granularity which corresponds to the reference numerology and is numbered (n+k0) is located in a preset fourth position of the second time-domain transmission unit; regarding the timing between the first and second time-domain transmission units, a timer is started from an end position of the first time-domain transmission unit, where the granularity which corresponds to the reference numerology and is numbered n is located;

when the first time-domain transmission unit is the UL transmission resources, and the second time-domain transmission unit is the DL transmission resources, the granularity which corresponds to the reference numerology and is numbered (n+k0) is located in a preset fifth position of the second time-domain transmission unit; or, regarding the timing between the first and second time-domain transmission units, a timer is started from the end position of the first time-domain transmission unit, where the granularity which corresponds to the reference numerology and is numbered n is located, wherein W is an even number greater than 1, n and k0 are both integers greater than 1.

14. The method according to claim 1, wherein the numerology of the UL transmission resources and the numerology of the DL transmission resources possess different symbol lengths, the same quantity of symbols, and different subcarrier spacing, or, the numerology of the UL transmission resources and the numerology of the DL transmission resources possess the same symbol length, the same subcarrier spacing, and different quantities of symbols;

wherein the timing comprises: taking a first-level granularity as a unit, compared with the first time-domain transmission unit, an offset value of the second time-domain transmission unit is k1, and, taking a second-level granularity as a unit, an offset value of the second time-domain transmission unit in the first-level granularity is k2, k1 and k2 are both integers greater than 1.

15. A transmission device in a wireless communication system, comprising: a memory, a processor, and a computer program stored in the memory and executable by the processor; when the computer program is executed by the processor, the processor performs steps of the method according to claim 1.

16. A computer readable storage medium comprising a computer program stored therein; wherein the computer program is executed by a processor to cause the processor to execute steps of the method according to claim 1.

* * * * *